Figure 1:
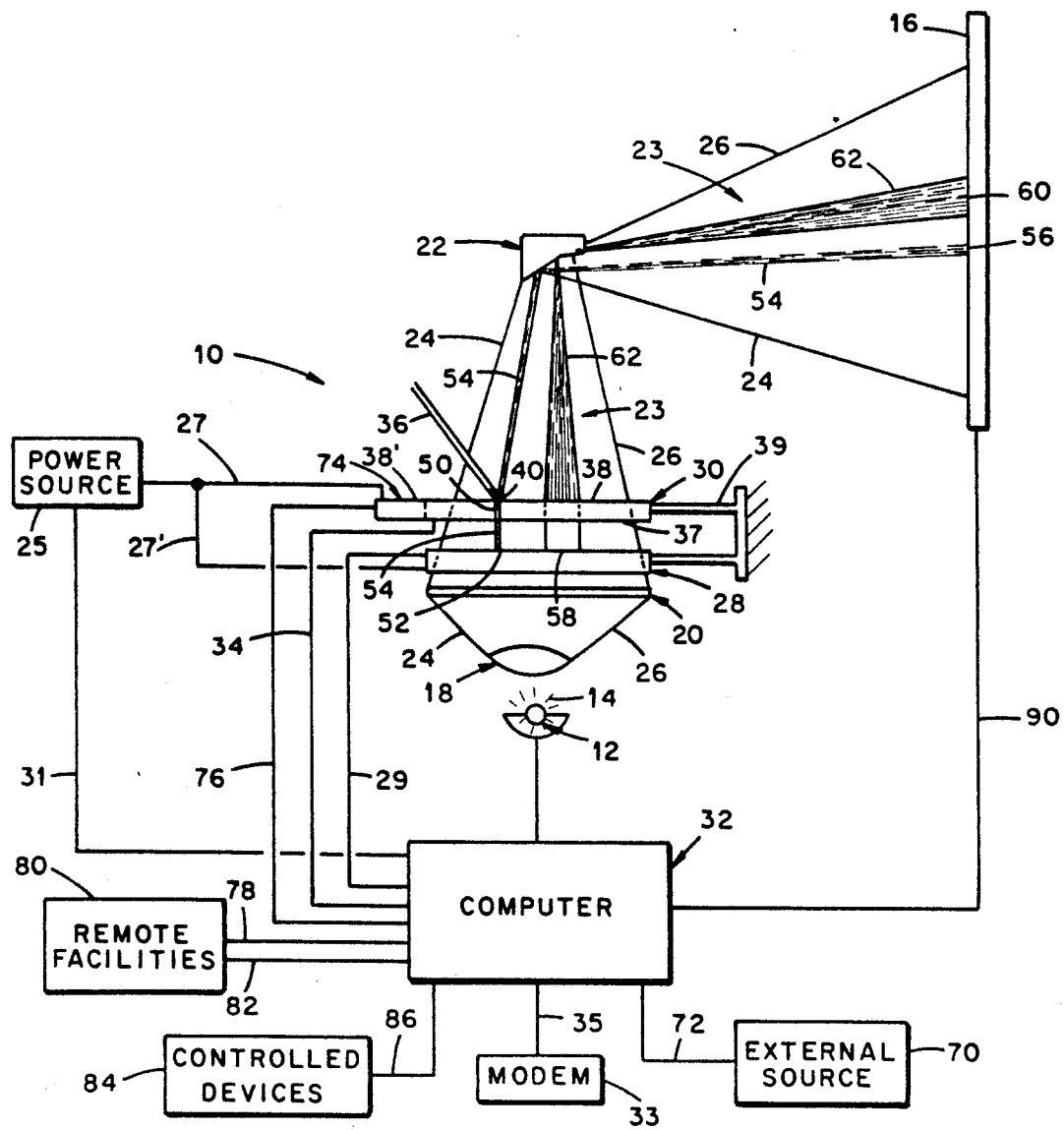

United States Patent [19]

Highfill

[11] Patent Number: 4,953,971
[45] Date of Patent: Sep. 4, 1990

[54] INTERACTIVE IMAGE PROJECTION APPARATUS

[76] Inventor: Robert R. Highfill, 114 Norway La., Oak Ridge, Tenn. 37830

[21] Appl. No.: 258,605

[22] Filed: Oct. 17, 1988

[51] Int. Cl.$^5$ .............................................. G03B 21/00
[52] U.S. Cl. ...................................... 353/122; 353/35; 353/DIG. 3; 353/DIG. 5; 353/44; 353/42
[58] Field of Search .................. 353/DIG. 3, DIG. 1, 353/DIG. 5, 98, 122, 121, 44, 42, 30, 35, 36; 340/712, 707; 350/331 R, 333; 364/520, 521

[56] References Cited

U.S. PATENT DOCUMENTS

| | | |
|---|---|---|
| 3,293,982 | 12/1966 | Appeldorn . |
| 3,482,911 | 12/1969 | Noble . |
| 3,652,148 | 3/1972 | Wysocki et al. . |
| 3,674,338 | 7/1972 | Cartmell et al. . |
| 3,732,429 | 5/1973 | Braunstein et al. . |
| 3,844,650 | 10/1974 | Nicholson et al. . |
| 3,895,866 | 7/1975 | Quervain ............................ 353/30 |
| 4,222,641 | 9/1980 | Stolov . |
| 4,294,524 | 10/1981 | Stolov . |
| 4,514,063 | 4/1985 | Wang et al. . |
| 4,613,207 | 9/1986 | Fergason . |
| 4,652,101 | 3/1987 | Grunwald . |
| 4,671,634 | 6/1987 | Kizaki et al. . |
| 4,763,993 | 8/1988 | Vogeley ........................ 350/331 T |
| 4,846,694 | 7/1989 | Erhardt ..................... 353/DIG. 3 X |

FOREIGN PATENT DOCUMENTS

| | | | |
|---|---|---|---|
| 2559923 | 8/1985 | France ................................ 353/122 |
| 0185740 | 8/1986 | Japan .................................. 353/44 |

OTHER PUBLICATIONS

Robert Adler et al., *A Three-Coordinate Touch System for Computer Displays*, SID 86 Digest, pp. 316–317.
Robert Adler et al., *Touch system adds third coordinate to display screen*, XYZ-Coordinate Touch System, May, 1986, pp. 15–16.
Mark Platshon, *Acoustic touch technology adds a new input dimension*, Computer Design, The Magazine of System Design & Integration, 3/15/88, vol. 27, No. 6, pp. 89–93.

*Primary Examiner*—Harry N. Haroian
*Attorney, Agent, or Firm*—Luedeka, Hodges & Neely

[57] ABSTRACT

An interactive image projection apparatus for the projection of computer generated images on a projection surface in cooperation with a light source and projection optics for projecting a beam of light from the light source onto the projection surface. The apparatus includes a substantially transparent image display device disposed in the beam of light and including means for receiving image-defining signals from a computer and producing an image based on the image-defining signals that is projected onto the projection surface in the beam of light. A touch screen, at least a portion of which is substantially transparent, is disposed in the beam of light between the image display device and the projection surface and includes means for generating a signal when touched for use as input information at the computer. Preferably, the touch screen is supported directly over the image display device. The signal from the screen may be used to modify the projected image to facilitate interaction in a convenient manner which promotes the interest and maintains the attention of persons viewing the image.

13 Claims, 2 Drawing Sheets

INTERACTIVE IMAGE PROJECTION APPARATUS

The present invention relates to image projection devices and more particularly relates to an interactive image projection apparatus that is useful in overhead projectors.

Image projection devices such as overhead projectors have been used for many years as a visual aid in instruction, demonstrations, and similar educational activities where relatively large audiences are involved. The conventional projector includes a light source and projection optics which, together with a viewing screen, provide an enlarged view of an image provided on a transparency laid over the transparent writing plate of the projector.

It has been proposed to combine with the conventional overhead projector a transparent liquid crystal display (LCD) or other image display device which produces an image in response to electronic signals to enable the projection of computer generated images on the viewing screen. Examples of LCDs for use with overhead projectors are disclosed in U.S. Pat. Nos. 3,844,650 and 4,652,101. The use of such LCDs with overhead projectors has expanded their capability, but interaction between the user and the computer is cumbersome and distracting to both the audience and presenter because it must be accomplished using auxiliary equipment such as a computer mouse or remote keyboard. These relatively complex activities are also not a natural parallel to the accustomed procedure of writing on a transparency. And, overhead projectors are typically used in darkened conditions which makes it difficult for the user to accurately perform complex procedures away from the projector because his eyes have been focused on the bright image on the writing plate or viewing screen.

Accordingly, it is an object of the present invention to provide an interactive image projection apparatus.

It is a further object of the present invention to provide an interactive image projection apparatus particularly useful for overhead projectors to display computer generated images on the viewing screen.

Another object of the invention is the provision of an interactive image projection apparatus of the character described which enables interaction between the user and the computer in a manner which is a natural parallel to the accustom practice of writing on a transparency laid over the writing plate of the projector.

Still another object of the invention is the provision of an interactive image projection apparatus for overhead projectors which offers unique and highly versatile interactive capabilities using readily available, relatively inexpensive components.

In accordance with one embodiment of the present invention, an interactive image projection apparatus is provided for the presentation of computer generated images on a projection surface in cooperation with a light source and projection optics. The apparatus comprises a substantially transparent image display device which is disposed in the beam of light and which includes means for receiving image-defining signals from a computer and for converting the signals to an image that is projected onto the projection surface in the beam of light. The apparatus further comprises a touch screen, at least a portion of which is substantially transparent in the beam of light between the display device and the projection surface. The touch screen includes means for generating a signal when touched for use as input information at the computer.

The invention provides a particularly useful interaction capability for overhead projectors. In one embodiment, an interactive imaging module is provided for placement on the transparent writing plate of an overhead projector having a light source and projection optics for projecting a beam of light onto a projector screen. In the module, a frame supports the touch screen over the image display device and the two together provide a very compact, portable apparatus that can be set-up with a preprogrammed computer in a matter of minutes.

In the embodiment of the invention involving an overhead projector, the image-display panel and touch screen may, of course, be built into the projector to provide a unit interactive image projection apparatus for use with a computer.

The signal produced by the screen in the various embodiments of the invention is used as input information at the computer in conjunction with appropriate software to provide significantly expanded interaction capabilities including direct modification of the projected image. These modifications include, for example, adding features or colors to the image, subtracting part of the image, zooming in on the image, scrolling the image, combining the image with other images, and similar operations. Other interaction capabilities include teleconferencing by transmission of the touch signal to a remote facility and/or control of external devices via connections through the computer.

Another advantage of the invention is that the viewing audience and the presenter or user can witness the image modifications as they are made which focuses attention and interest on the image. Attention and interest are also kept focused because there are no distracting side activities as may be the case with the use of a keyboard or other auxiliary device. Furthermore, in the embodiment involving an overhead projector, modification of the image and/or instructions to the computer can be accomplished in a manner that is keeping with the accustomed practice of writing on a transparency since the touch screen may be placed in basically the same location with respect to the user as the writing plate of the projector.

Figure 2:
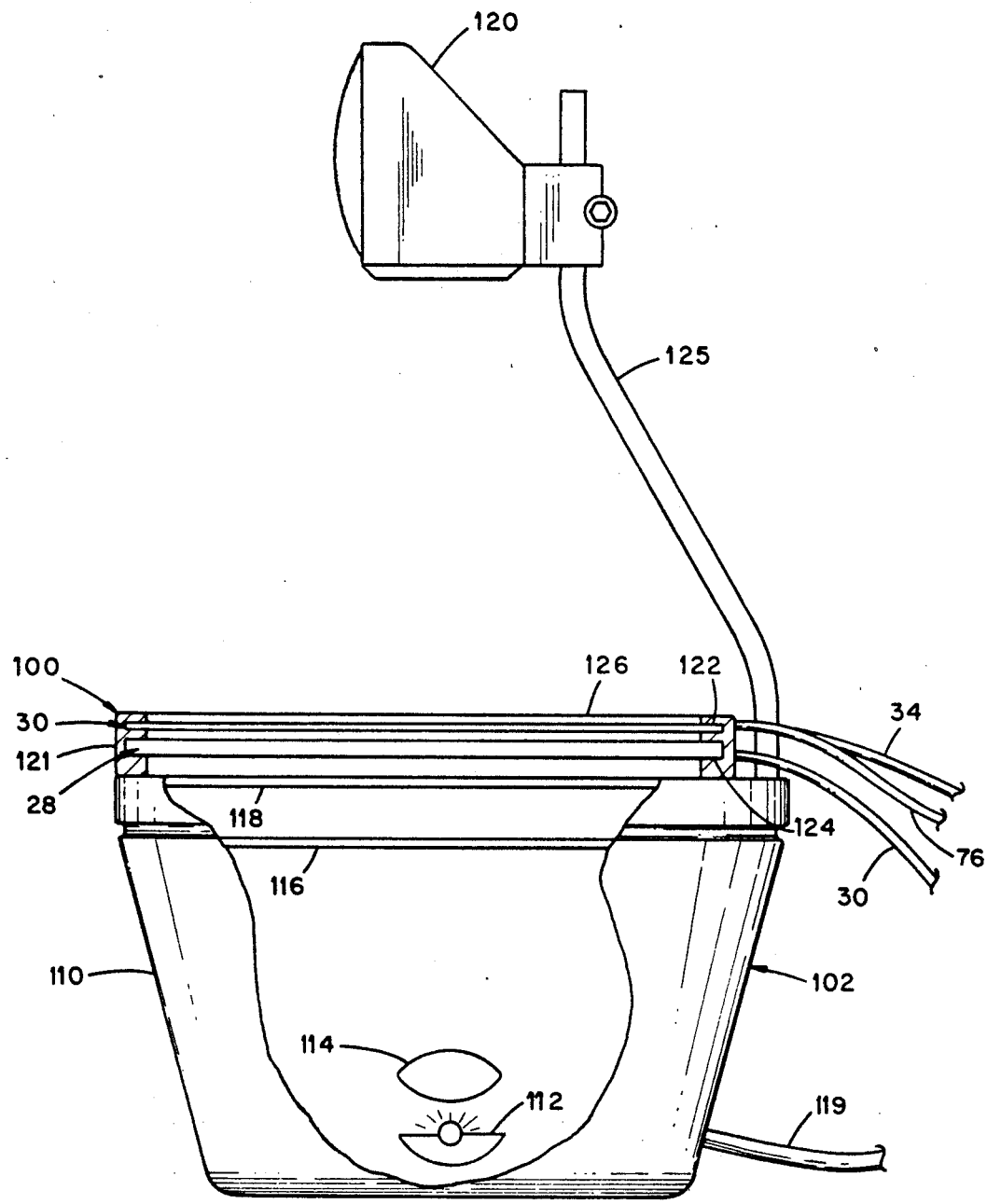

The above and other objects and advantages of the invention will become further known with reference to the following detailed description of embodiments of the invention when considered in conjunction with the accompanying drawings in which:

FIG. 1 is a diagrammatic view illustrating features of an interactive image display apparatus in accordance with one embodiment of the invention; and FIG. 2 is a side elevational view of another form of the interactive image display apparatus of the invention for use with an overhead projector.

Referring now to the drawings in which like reference characters designate like or corresponding parts throughout the several views, an interactive image display apparatus 10 is shown in FIG. 1 illustrating features of one form of the present invention. In the illustrated embodiment, a light source such as a lamp and its associated reflector indicated at 12 emit light as at 14 which is projected in the form of a beam using projection optics onto a projection surface 16. The projection optics may include as components a condensing lense 18, a Fresnel lense 20, and an objective 22, which establish and project a beam 23 indicated between lines 24 and 26 onto the surface 16. These components correspond to those typically included in an overhead projector.

An image display device 28 receives image-defining signals through conductor 29 from a computer generally designated at 32, and is disposed in the beam 23. The computer 32 may be an IBM PC, for example, and may be accompanied in use by a modem indicated at 33 and connected to the computer 32 by conductor 35. Power from a source 25 is directed to the image display apparatus via conductor 27' and for the computer via conductor 31.

The image display device 28 produces an image based on the image-defining signals from the computer 32 which is displayed thereon and is projected on the projection surface 16 in the beam 23 using the aforementioned projection optics. The image display device 28, apart from its image-displaying aspects, is substantially transparent to the light in the beam 23 that is projected onto the surface 16, and is preferably a liquid crystal display (LCD) panel such as the LCD panels disclosed in U.S. Pat. Nos. 3,844,650 and 4,652,101 which are hereby incorporated by reference. In general, such devices are provided in the form of relatively thin panels and operate in response to electronic signals to produce opaque patterns representing features of desired images. Light passes through the panel only in the remaining transparent areas so that the image is projected. A suitable commercially available LCD panel of this type for use in the invention is the liquid crystal panel display sold under the trademark DATASHOW by Kodak.

A touch-input device 30 commonly known as a touch screen, and referred to herein as such, has a transparent portion 37 which is disposed in the beam 23 between the device 28 and surface 16 so that the beam passes through at least a part of the transparent portion.

The image display device 28 and touch screen are supported in the beam 23 on a frame structure indicated generally at 39.

The touch screen 30 generates a touch signal in conductor 34 when a pointer 36, such as a finger or stylus, is placed on a surface 38 of the screen 30. The signal preferably corresponds at least to the position of a tip end 40 of the pointer 36 on the surface 38 of the screen 30. The signal may also correspond to the pressure applied to the surface 38 by the pointer 36, as will be seen in the following. Power for the screen may be obtained from source 25 by branch conductor 27.

The signal in conductor 34 is employed in the computer 32 as input information as will be described to provide a wide range of interactive capabilities including direct modification of the image displayed on the device 28 and projected on the surface 16.

Touch screens for use in the present invention preferably take the form of relatively thin panels conforming substantially in their major dimensions to the major dimensions of the image display device 28. Included among the available touch screen alternatives are infrared touch screens, capacitive touch screens, analogue resistive-membrane screens, and surface acoustic wave (SAW) touch screens, for example. Their construction and operation are well-known and need not be repeated in detail here. However, the following brief descriptions are provided in order to facilitate selection of some of the available alternatives for use in the invention.

In general, infrared touch screens employ light emitting diodes (LEDs) to beam infrared signals across the surface of a monitor screen to a set of photodetectors. Touch activation occurs when a pointing device interrupts an intersection of infrared signals, so the surface need not be physically touched in the technical sense. However, the term "touch screen" as used herein includes devices which operate in this manner.

Capacitive touch screens generally include a transparent coating of indium tin oxide (ITO) on the inner and outer surfaces of a glass panel. In some cases, capacitive touch screens also contain a coating of tin antimony oxide (TAO) on the outer surface. Low current flows across the capacitive panel and establishes the frequencies of four oscillator circuits at the panels corners. In one mode, when the screen is touched, the operator's body impedance alters the frequency of the four oscillators, and the touch location is calculated from the differential frequency changes of the four oscillators.

Analogue resistive-membrane screens are a high-resolution version of the known membrane-switch technology. These screens typically consist of a clear conductive film over the surface of a clear glass or plastic panel, separated by an array of tiny, transparent separator dots. The film overlay consists of either polycarbonate or oriented polyester. The facing surfaces of the film and clear panel are coated with a conductive material such as ITO. Voltage travels alternately along the X and Y axis across the touch screen, while the opposite edges are alternately grounded, thus creating a uniform voltage gradient across the screen. When the screen is touched, the conductive film layer, acting as a voltage probe, touches the bottom layer, causing electrical contact to be made and a voltage measurement to be sent to the controller, registering the touch locations.

Of the available alternatives, SAW touch screens are preferred for use in the invention. SAW touch screens employ inaudible, high-frequency acoustic waves which travel over the surface of glass at precise speeds and are reflected by an array of reflectors along the edges to provide a scan of the X and Y coordinate axes alternately. When a touch occurs, the pointing device absorbs a portion of the energy flowing in the X and Y directions, attenuating the signal. By comparing the position of the attenuation relative to the scanning signal envelope, the touch location is calculated. A SAW touch screen employs the advantage that a pliable pointing device such as a finger can deliver varying degrees of contact area and pressure, absorbing more or less energy so that location, contact area, and pressure can be sensed. A suitable SAW touch screen is commercially available under the trademark SAW Touch from the Elographics Company of Oak Ridge, Tenn.

Returning to FIG. 1, the touch signal produced by the screen 30 in conductor 34 may be utilized as input information by the computer 32 in conjunction with appropriate software with particular advantage to modify the image produced by the image display device 28. For example, the screen 30 may sense a touch location 50 of the end 40 of the pointer 36 and transmit a signal in conductor 34 corresponding to the location 50 to the computer 32, which in turn produces an output signal in conductor 29 appropriate to cause the device 28 to produce a representation 52 in optical alignment with the location 50.

The representation 52 is thus available for being projected onto the projection surface 16 as indicated by the shadow line 54 shown extending through the transparent portion 37 of the touch screen 30 and reflected onto the projection surface 16 from the objective 22 at location 56. It is noted that in the case in which the computer 32 is instructed to cause the representation 52 to be displayed in optical alignment with the location 50 of the tip 40 of the pointer 36, the shadow of the tip 40 may partially or totally overlap the shadow line 54 if the tip is opaque. In this case, generation of the representation 52 may not be readily apparent on the surface 16 until the pointer 36 is removed. However, the computer 32 may be configured to continue generating a signal in the conductor 29 after the pointer 36 is removed from the screen 30 so that only the representation 52 is visible at location 56 on the surface 16. Or, the computer 32 may be configured so that the signal in conductor 29 by which representation 52 is produced fades over a time interval following removal of the pointer 36, for example.

Other representations may, of course, be produced by the computer 32 on the display device 28 and are illustrated diagrammatically at 58. They may be produced as a result of preprogramming or may be produced as a result of a previous touch on the screen 30. These representations 58 may be projected onto the surface 16 at a location 60 as in shadow line 62.

The signal generated in conductor 34 by placement of the pointer 36 on the surface 38 of the screen 30 inside or outside of the area within the shadow line 62 of representation 58 passing through the screen may also be employed to modify the representation projected onto the surface 16 at location 60. For example, representation 58 of the image may be enlarged or reduced in size, or its dimension or configuration otherwise altered. The signal in conductor 34 may also be employed to zoom in on a part of the representation 58 of the image, the image can be scrolled or segmented, erased in part or entirely, or combined with other images stored in or available to the computer from an external source indicated as at 70 via conductor 72.

The touch screen 30 may further include a dedicated section 74 which may be located outside of the beam 23 projected onto the projection surface 16. The section 74 may be connected to the computer 32 by a separate conductor 76 and may be opaque or transparent. Like the other part of the touch screen 30 through which the beam passes, the dedicated section 74 may be configured with a touch responsive surface 38' as described above in order to generate a signal in conductor 76 when touched by the pointer 36 and the signal may be used as input information at the computer 32. Preferably, section 74 of the touch screen 30 is in the nature of a control panel and may include a graphic overlay or the like indicating various controlled features associated with touching particular portions of its upper surface 38'.

Included among the controlled features which may be activated by touching designated areas on the surface 38' of the dedicated section 74 are the image modification features discussed above. Additionally, signals in conductor 76 corresponding to a particular position and/or pressure at which the surface 38' is touched can be employed in the computer 32 through the use of appropriate software to produce a transmission signal in a conductor 78 leading to one or more remote facilities as at 80 which are in turn provided with one or more installations of the apparatus of the present invention to enable teleconferencing. The signal or signals in conductor 78 will vary widely depending on the circumstances and objectives of the teleconferencing including, for example, transmission of a duplicate of the image-defining signal produced by the computer 32 in conductor 29 so that the same image may be projected at all locations. Thus, modifications of the image resulting from touching surface 38 or 38' may be visible simultaneously throughout the system. A return conductor 82 may be provided to transmit signals from the remote facilities 80 to the computer 32 and these signals may be employed by the computer for image modification and other purposes as described herein so that all users can interact with all other users.

Signals in the conductor 76 leading from the dedicated section 74 may also be used as input information at the computer 32 to control other devices indicated generally at 84 via conductor 86. These devices may include, for example, environmental control devices such as room heating, cooling, and lighting; sound systems which may be associated with projection of the image; and the operation of equipment associated with projection of the image such as a working model or the like, for example.

Additionally, the signal in conductor 76 from the dedicated section 74 may be utilized in the computer 32 to modify a characteristic of the projection surface 16 via conductor 90 where the surface 16 is of the type that has characteristics alterable by means of an electronic signal.

In all cases, the computer may also be instructed to store the image projected onto the surface 16 after each modification. The stored information can then be used to obtain permanent copies of each image which is similar to keeping marked-up overlays used in conventional overhead projection applications. However, unlike the conventional application, images will be available for each stage of the modification.

FIG. 2 illustrates a particularly advantageous embodiment of the invention in which the touch screen 30 and image-display device 28 of FIG. 1 are combined in a unit to provide a portable module 100 which is used in conjunction with an overhead projector 102.

The projector 102 may be conventional in construction and thus include a basically box-shaped housing 110 containing a lamp and its associated reflector 112, a condensing lense 114, a Fresnel lense 116, and a generally rectangular or square glass writing plate 118 extending over a substantial portion of the upper surface of the housing. An objective 120 is carried over the writing plate 118 on an arm 125.

The projector 102 itself operates in the conventional manner to project a beam of light produced by the lamp and reflector 112, condensing lense 114, Fresnel lense 116, and objective 120 onto a projection screen. Power cord 119 supplies electric current to the lamp 112.

In a preferred form, the module 100 includes the touch screen 30 situated over the display device 28, with the screen in the form of a SAW panel and the display supported together in a bezel-like frame 121. The frame 121 has internal channels 122 and 124 that support the screen 30 and image display device 28 adjacent their edges so that the center portion of the module 100 remains substantially transparent. The screen 30 and the display device 28 may be supported in spaced-apart relation in the frame 121 with a glass or other transparent panel 126 located between the screen 30 and display panel 28 for support.

The module 100 is preferably dimensioned to cover the writing plate 118 in a sealed or substantially sealed fashion to minimize the escape of light therebetween. The touch screen 30 and display device 28 operate together and with the computer 32 through conductors 34 and 76, and conductor 29, respectively, (as described above with reference to FIG. 1) to provide a highly useful interactive image projection apparatus in the context of an overhead projector. A particularly useful advantage of the invention in the context of overhead projectors is that the user can employ the module 100 in a manner that is a natural parallel to the accustomed practice of writing on the writing plate 118. In addition, image modification can be achieved without resort to auxiliary devices such as keyboards and the like so that distracting side activities are avoided. The nature in which the modification is achieved focuses interest and attention on the image to enhance the transfer of information to the audience. The modification is also accomplished under lighted conditions. The module 100 is also portable and fits easily onto the writing plate 118 of the projector 102 requiring no more than a small vertical space of a couple of inches or less to contain the touch screen 30 and image display device 28.

It is to be understood that the forms of the invention illustrated herein are to be considered as preferred embodiments of the same and that changes in the shape and arrangement of the parts, and other modifications and substitutions may be resorted to without departing from the scope and the spirit of the claims. For example, the touch screen 30 and image display device 28 of the module 100 of FIG. 2 may be permanently incorporated into the projector 102 with the screen 30 replacing the writing plate 118 and with the device 28 located over the Fresnel lense 116.

What is claimed is:

1. An interactive image projection apparatus for the presentation of computer generated images on a projection surface in cooperation with a light source and projection optics for projecting a beam of light from the light source onto the projection surface, comprising:
    a substantially transparent image display device for interacting with a computer that generates and sends image-defining signals to the image display device and including means for receiving the image-defining signals from the computer and for producing an image based on said image-defining signals, said image display device being disposed in the beam of light so that the image produced by said image display device is projected onto the projection surface in the beam of light; and
    a touch screen for interacting with the computer, at least a portion of said touch screen being substantially transparent and disposed in the beam of light between the display device and the projection surface so that the beam of light passes is sequence through the display device and the touch screen on its way to the projection screen, said touch screen including means for generating a signal when touched and sending the touch-generated signal to the computer for use as input information at the computer so that upon receiving the touch-generated signals, the computer modifies the image produced by the image display device in accordance with the touch-generated signals; and
    said touch screen being arranged in close physical proximity to the display device to render the touch screen/image display device arrangement relatively compact.

2. The interactive image projection apparatus of claim 1, wherein said generating means of said touch screen generates a signal corresponding to a position at which it is touched and a signal corresponding to the pressure at which it is touched.

3. The interactive image projection apparatus of claim 1, wherein said image display apparatus comprises an LCD panel having an exit surface through which light in the beam exits and said touch screen is disposed on said exit surface.

4. The interactive image projection apparatus of claim 1, wherein said touch screen includes a dedicated section including means for generating a signal corresponding to a position at which said dedicated section is touched for use in the computer as input information.

5. The interactive image projection apparatus of claim 1 wherein each of the image display device and the touch screen include a substantially planar panel disposed in the beam of light as aforesaid and the panels of the image display device and the touch screen are arranged in a parallel relationship.

6. An interactive image projection apparatus for the presentation of computer generated images on a projection surface in cooperation with a light source and projection optics for projecting a beam of light from the light source onto the projection surface, comprising:
    a computer including means for generating image-defining signals;
    a substantially transparent image display device for interacting with said computer and including means for receiving said image-defining signals from said computer and for producing an image based on said image-defining signals, said image display device being disposed in the beam of light so that the image produced by said image display device is projected onto the projection surface in the beam of light;
    a touch screen for interacting with said computer, at least a portion of said touch screen being substantially transparent and disposed in the beam of light between said image display device and the projection surface so that the beam of light passes in sequence through the display device and the touch screen on its way to the projection surface, said touch screen including means for generating a touch signal when touched for use as input information at the computer so that upon receiving the touch-generated signals, the computer modifies the image produced by the image display device in accordance with the touch-generated signals; and
    transmission means for transmitting signals including said image-defining signals from said computer to said image display device and for transmitting signals including said touch signal from said touch screen to said computer; and
    said touch screen being arranged in close physical proximity to the display device to render the touch screen/image display device arrangement relatively compact.

7. The apparatus of claim 6, wherein said computer is configured to generate modified image-defining signals in response to said touch signal which are transmitted to said image display device by said transmission means and said receiving and producing means of said image display device is configured to produce a modified image based on said modified image-defining signals, whereby touching said touch screen causes said image display device to produce a modified image.

8. The apparatus of claim 7, wherein said touch signal corresponds to a touch position on said touch screen at which it is touched and said modified image-defining signals include a position signal, said receiving and producing means of said image display device being configured to produce an image at a position that is in substantial optical alignment with said touch position on said touch screen.

9. The apparatus of claim 4, wherein said touch screen includes a dedicated section located outside said beam of light, said dedicated section comprising a control panel portion having distinct control locations associated with the control of predefined controlled features and said generating means of said touch screen being configured to generate control signals when touched at said control locations for transmission to said computer by said transmission means and for use as input information at said computer.

10. The apparatus of claim 6, further comprising frame means for supporting said touch screen in a fixed, closely adjacent, superposed position on said image display device and for maintaining the touch screen/image display device arrangement in its compact condition.

11. An interactive image display apparatus for producing an image in response to a signal generated by a computer, said apparatus comprising:
   frame means;
   a substantially transparent image display panel and light means for illuminating said display panel with a single light beam, both of the image display panel and the light means being supported on said frame means, said image display panel including means for receiving image-defining signals from the computer and for producing an image based on said image-defining signals which is visible on said image display panel when said panel is illuminated by said light means; and
   a touch screen supported on said frame means over said image display panel and in close proximity thereto so that the touch screen/image display arrangement is relatively compact, at least a portion of said touch screen being substantially transparent and being disposed within the single light beam so that the image produced on said image display panel is visible through said touch screen and the single light beam passes in sequence through the display panel and the touch screen, said touch screen further including means for generating a touch signal when touched for use as input information at the computer so that upon receiving the touch-generated signals, the computer modifies the image produced by the display panel in accordance with the touch-generated signals, said touch screen and computer adapted to interact with one another so that as an object is moved in contact across said touch screen, the path of object movement is produced by the display panel to thereby accommodate the addition of hand-writing to the produced image.

12. An interactive image projection apparatus comprising, in combination, an overhead projector having a light source and projection optics for projecting a beam of light onto a projection screen from said light source, a substantially transparent image display panel for interacting with a computer that generates and sends image-defining signals to the image display panel and including means for receiving the image-defining signals from the computer and for producing an image in response to said image-defining signals, said image display panel being disposed in said beam of light so that the image produced by said image display panel is projected into the projection screen in said beam of light, and a touch screen for interacting with the computer, at least a portion of said touch screen being substantially transparent and disposed on said image-display panel in the beam of light so that the beam of light passes in sequence through said display panel and the tough screen on its way to the projection screen and so that the touch screen and image display panel provide a relatively compact arrangement, said touch screen including means for generating a touch signal when touched and sending the touch-generated signals to the computer for use as input information at the computer so that upon receiving the touch-generated signals, the computer modifies the image produced by the image display panel in accordance with the touch-generated signals.

13. An image display apparatus for use with an overhead projector having a light source and projection optics for projecting a beam of light from the light source onto a projection screen, and an enclosure containing the light source with a transparent writing plate disposed across the enclosure through which light passes for being projected onto the screen in the beam of light, the apparatus comprising:
   a substantially transparent image display panel for interacting with a computer that generates and sends image-defining signals to the image display panel including means for receiving the image-defining signals from the computer and for producing an image based on said image-defining signals that is projectable onto the screen in the beam of light by placing said image display device therein;
   a frame for removably supporting said image display panel on the enclosure of the overhead projector over the writing plate so that light passing through the writing plate from the light source and projected onto the screen passes through said image display panel and exits from a surface of said panel;
   a touch screen for interacting with the computer, at least a portion of said touch screen being substantially transparent and supported by said frame on said surface of said image display panel from which light exits so that the touch screen is in close physical proximity to the image display panel and the touch screen/image display panel arrangement is relatively compact, said touch screen including means for generating a touch signal when touched and sending the touch-generated signal to the computer for use as input information at the computer for modification of said image-defining signals and this modification of said image produced on said image display panel; and
   transmission means for transmitting signals including said image-defining signals between said image display panel and the computer and for transmitting signals including said touch signal between said touch screen and the computer.

* * * * *

UNITED STATES PATENT AND TRADEMARK OFFICE
CERTIFICATE OF CORRECTION

PATENT NO. : 4,953,971

DATED : September 4, 1990

INVENTOR(S) : Robert R. Highfill

It is certified that error appears in the above-identified patent and that said Letters Patent is hereby corrected as shown below:

Column 2, lines 9-10, after "a", delete "projector" and substitute --projection--;

Column 7, line 57, after "passes", delete "is" and substitute --in--;

Column 9, line 43, after "display" add --panel--;

Column 10, line 14, after "through" delete "said" and insert --the--; and delete "tough" and insert --touch--;

Column 10, line 59, first word, delete "this" and insert --thus--.

Signed and Sealed this

Seventh Day of January, 1992

Attest:

HARRY F. MANBECK, JR.

*Attesting Officer*   *Commissioner of Patents and Trademarks*